United States Patent
Murai et al.

(10) Patent No.: US 12,115,489 B2
(45) Date of Patent: Oct. 15, 2024

(54) EXHAUST GAS TREATMENT METHOD AND TREATMENT FACILITY

(71) Applicant: JFE STEEL CORPORATION, Tokyo (JP)

(72) Inventors: Ryota Murai, Tokyo (JP); Goro Okuyama, Tokyo (JP); Shunsuke Oura, Tokyo (JP); Reo Fujimura, Tokyo (JP); Tomomichi Nakamura, Tokyo (JP); Shinichi Suejima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 211 days.

(21) Appl. No.: 17/642,548

(22) PCT Filed: Aug. 13, 2020

(86) PCT No.: PCT/JP2020/030823
§ 371 (c)(1),
(2) Date: Mar. 11, 2022

(87) PCT Pub. No.: WO2021/049246
PCT Pub. Date: Mar. 18, 2021

(65) Prior Publication Data
US 2022/0323898 A1 Oct. 13, 2022

(30) Foreign Application Priority Data
Sep. 11, 2019 (JP) .................. 2019-165721

(51) Int. Cl.
*B01D 53/00* (2006.01)
*B01D 5/00* (2006.01)

(52) U.S. Cl.
CPC ......... *B01D 53/002* (2013.01); *B01D 5/0027* (2013.01)

(58) Field of Classification Search
CPC ...... B01D 53/00; B01D 53/64; B01D 5/0027; B01D 2252/103; B01D 2258/06; B01D 2257/602; B01D 2258/0291
See application file for complete search history.

(56) References Cited

U.S. PATENT DOCUMENTS

| | | | | |
|---|---|---|---|---|
| 4,539,816 A | * | 9/1985 | Fox ..................... | B01D 53/002 62/402 |
| 5,429,667 A | * | 7/1995 | Ebner ................. | B01D 5/0093 95/187 |

(Continued)

FOREIGN PATENT DOCUMENTS

| CN | 204485351 U | 7/2015 |
|---|---|---|
| CN | 205700020 U | 11/2016 |

(Continued)

OTHER PUBLICATIONS

Apr. 26, 2023 Office Action issued in Chinese Patent Application No. 202080063572.8.

(Continued)

*Primary Examiner* — Frantz F Jules
*Assistant Examiner* — Martha Tadesse
(74) *Attorney, Agent, or Firm* — Oliff PLC

(57) ABSTRACT

An exhaust gas treatment method by which mercury contained in exhaust gas can be separated and removed efficiently and inexpensively. The method includes cooling an exhaust gas containing mercury in metal vapor phase by spraying water or other methods to condense mercury in the exhaust gas from metal vapor phase into metal liquid and thus to separate and remove mercury from the exhaust gas. When the exhaust gas is cooled by spraying water, the sprayed water is collected and separated into separated water and a solid containing mercury that has condensed to metal liquid, and mercury is recovered from the solid. The metal mercury particles that have condensed to metal liquid are (Continued)

dispersed in cooling water. The metal mercury particles can thus be easily separated and recovered by using a suitable separation device.

4 Claims, 1 Drawing Sheet

(56) References Cited

U.S. PATENT DOCUMENTS

| | | |
|---|---|---|
| 2004/0120771 A1 | 6/2004 | Vinegar et al. |
| 2018/0238543 A1 | 8/2018 | Kappes et al. |

FOREIGN PATENT DOCUMENTS

| | | | |
|---|---|---|---|
| EP | 2 002 902 A1 | | 12/2008 |
| JP | S61271088 A | | 12/1986 |
| JP | H08-308817 A | | 11/1996 |
| JP | H10-230137 A | | 9/1998 |
| JP | 2003161586 A | * | 6/2003 |
| JP | 2005-512791 A | | 5/2005 |
| JP | 2008194546 A | * | 8/2008 |
| JP | 2008296077 A | | 12/2008 |
| JP | 2009-184902 A | | 8/2009 |
| JP | 2014-136169 A | | 7/2014 |
| JP | 2014171986 A | * | 9/2014 |

OTHER PUBLICATIONS

Yazhi, Wang, "Overview of Mercury Removal Technology for Flue Gas From Coal-Fired Power Plants", Hebei Provincial Academy of Environmental Science, Mar. 31, 2009.

Sep. 25, 2023 Office Action issued in Chinese Patent Application No. 202080063572.8.

Tang, Xiuyi, et al., "Trace Elements in Chinese Coal", The Commercial Press, p. 163, Dec. 31, 2004.

Oct. 20, 2020 International Search Report issued in International Patent Application No. PCT/JP2020/030823.

Oct. 4, 2022 Extended European Search Report issued in European Patent Application No. 20863461.8.

Dec. 14, 2022 Office Action issued in Chinese Patent Application No. 202080063572.8.

Jan. 31, 2024 Office Action issued in Chinese Patent Application No. 202080063572.8.

Beijing Central Engineering and Research Institute of Nonferrous Metallurgical Industries et al. "Heavy Nonferrous Metal Smelting Design Manual: Tin, Antimony, Mercury, Precious Metals Volume" Metallurgical Industry Press, Aug. 31, 1995, p. 398.

Aug. 27, 2024 Office Action Korean Patent Application No. 10-2022-7007431.

* cited by examiner

EXHAUST GAS TREATMENT METHOD AND TREATMENT FACILITY

TECHNICAL FIELD

This application relates to an exhaust gas treatment method and an exhaust gas treatment facility for separating and removing mercury from exhaust gas containing mercury in metal vapor phase.

BACKGROUND

Substances burned in incinerators or treated in various heat treatment furnaces may contain trace amounts of mercury. Having a boiling point of 357° C., mercury is easily converted into metal in metal vapor phase and entrained in exhaust gases when substances containing trace amounts of mercury are burned in incinerators or heated in heat treatment furnaces. In terms of environmental protection, it is important to separate and remove mercury from the exhaust gases containing mercury in metal vapor phase.

In the related art, various methods for removing mercury contained in exhaust gases have been proposed. For example, Patent Literature 1 discloses a method for blowing activated carbon into a mercury-containing exhaust gas to remove mercury through adsorption on activated carbon. Patent Literature 2 discloses a method for blowing a mercury chlorinating agent, such as hydrogen chloride, into a mercury-containing exhaust gas and transferring mercury chloride to a liquid phase to separate and recover mercury chloride. This method makes use of high solubility of mercury chloride in water.

CITATION LIST

Patent Literature

PTL 1: Japanese Unexamined Patent Application Publication No. 8-308817
PTL 2: Japanese Unexamined Patent Application Publication No. 10-230137

Non Patent Literature

NPL 1: Urabe et al., "Thermodynamic Consideration on Mercury Species in Combustion Gas of Municipal Refuse Incinerator", Journal of the Japan Society of Waste Management Experts, 1990, Vol. 1, No. 1, pp. 10-18

SUMMARY

Technical Problem

However, the method of Patent Literature 1 uses activated carbon as an adsorbent to increase the treatment costs although it can certainly separate and remove mercury from the exhaust gas. The method of Patent Literature 2 can achieve the purpose of removing mercury from the exhaust gas but needs a water treatment in a water treatment system in the latter stage, which requires a facility for the water treatment and causes an economical problem. In addition, the use of chlorinating agents, which are normally corrosive substances, unavoidably affects an exhaust gas pipe and increases the frequency of maintenance and replacement of the exhaust gas pipe, causing an economical problem.

An object of the disclosed embodiments is to solve the problems in the related art as described above and provide an exhaust gas treatment method and an exhaust gas treatment facility that can separate and remove mercury contained in exhaust gas efficiently and inexpensively and can recover the separated and removed mercury.

Solution to Problem

The inventors carried out intensive studies to solve the problems and, as a result, have found that, when exhaust gas containing mercury in metal vapor phase is cooled by spraying water or other methods to condense mercury contained in the exhaust gas from metal vapor phase into liquid mercury contained in the exhaust gas can be efficiently separated and removed without using an adsorbent, and the separated and removed mercury can be recovered.

The disclosed embodiments have been accomplished on the basis of the above finding. The gist of the disclosed embodiments is as described below.

[1] An exhaust gas treatment method includes cooling an exhaust gas containing mercury in metal vapor phase to condense mercury in the exhaust gas from metal vapor phase into metal liquid and thus to separate and remove the mercury from the exhaust gas.

[2] In the exhaust gas treatment method according to [1], the cooling involves cooling the exhaust gas at an average cooling ratio of 4.5 to 18.0° C./sec.

[3] In the exhaust gas treatment method according to [1] or [2], the cooling is performed by spraying water into the exhaust gas.

[4] The exhaust gas treatment method according to [3] further includes collecting water sprayed into the exhaust gas, separating the collected water into separated water and a solid containing the mercury that has condensed to metal liquid, and recovering the mercury from the solid.

[5] An exhaust gas treatment facility includes an exhaust gas cooling device that cools an exhaust gas containing mercury in metal vapor phase to condense mercury in the exhaust gas from metal vapor phase into metal liquid.

[6] In the exhaust gas treatment facility according to [5], the exhaust gas cooling device is a water spray cooling device that performs the cooling by spraying water into the exhaust gas.

[7] The exhaust gas treatment facility according to [6] further includes a solid-liquid separation device that collects water sprayed by the water spray cooling device, separates the collected water into separated water and a solid containing the mercury that has condensed to metal liquid, and recovers the mercury from the solid.

Advantageous Effects

According to embodiments, mercury can be separated and removed from exhaust gas containing mercury in metal vapor phase efficiently and inexpensively without using an adsorbent, and the separated and removed mercury can be recovered. Since mercury is separated as a liquid mercury from exhaust gas, mercury can be recovered by a relatively simple means. From this point of view, the method of the disclosed embodiments can also be an economical treatment method.

DETAILED DESCRIPTION

Figure 1:
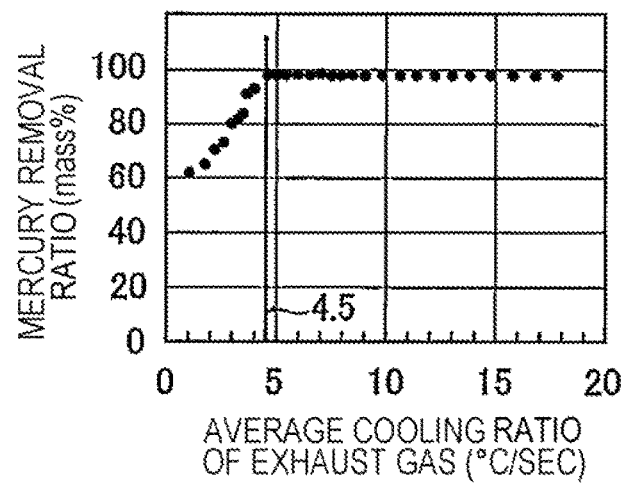
FIG. 1 is a graph showing the relationship between the exhaust gas cooling ratio and the mercury removal ratio.

An exhaust gas treatment method of the disclosed embodiments includes rapidly cooling an exhaust gas containing mercury in metal vapor phase to condense mercury in the exhaust gas from metal vapor phase into metal liquid and thus to separate and remove mercury from the exhaust gas.

The exhaust gas is rapidly cooled by any method, but cooling by spraying water will be described below as an example since spraying water into the exhaust gas is a simple and economical method.

In the disclosed embodiments, the exhaust gas is cooled by spraying water to condense mercury into metal liquid without transferring mercury to cooling water (i.e., without dissolving mercury in the form of mercury chloride in cooling water). The metal mercury particles that have thus condensed to metal liquid are dispersed in cooling water (to form a slurry) so as to, for example, adhere to the dust in the exhaust gas trapped in cooling water at the same time. The metal mercury particles can thus be easily separated and recovered by using a suitable separation device.

There are some reports about the reactions of mercury in exhaust gases. For example, Non Patent Literature 1 supports the finding that metal mercury is stable at high temperature, and mercury chloride is stable in the presence of chlorine at low temperature.

The reaction between mercury and chloride (hydrogen chloride) is represented by formula (1) below.

$$Hg + HCl + 1/2 O_2 \leftrightarrow HgCl_2 + H_2O \quad (1)$$

In general, chlorine is abundant compared with mercury, and mercury and chlorine may easily react with each other at low temperature to form mercury chloride. In the method described in Patent Literature 2, a chlorinating agent may be added to improve the mercury recovery ratio, or actively convert mercury into water-soluble mercury chloride, particularly, in the treatment of exhaust gas having high levels of mercury.

By the way, the forward reaction of the formula (1) is unlikely to occur at high temperature as described in Non Patent Literature 1. Thus, rapidly cooling high-temperature exhaust gas (containing mercury in metal vapor phase) into low-temperature exhaust gas (containing liquid mercury) with water allows mercury to be recovered in a slurry form in which liquid mercury and the dust in exhaust gas trapped in water at the same time are dispersed. Since a liquid mercury is insoluble in water, mercury can be present only in the slurry. At normal temperature, mercury is liquid but exhibits a solid-like behavior when adhering to the dust trapped in water or being in the form of individual particles. Thus, a mercury-concentrated dust slurry can be easily separated into water and mercury-concentrated dust by using a suitable separation device.

The inventors have studied the cooling conditions required for recovering metal mercury as a liquid mercury without generating mercury chloride when cooling mercury in metal vapor phase. In general, a water spray cooling device is used to cool high-temperature exhaust gas. The analysis of the mercury form in the exhaust gas and water-soluble mercury by variously changing the cooling ratio of the exhaust gas in the water spray cooling device demonstrates that rapid cooling is effective to recover mercury in the exhaust gas as a liquid mercury. It is also demonstrated that the cooling ratio (average cooling ratio) in rapid cooling is preferably from 4.5 to 18.0° C./sec, and when the exhaust gas is cooled at this cooling ratio, mercury in the exhaust gas can be separated and removed as a liquid mercury assuredly and economically (the water spray cooling device can be operated economically).

FIG. 1 shows the result of the relationship between the average cooling ratio of the exhaust gas and the mercury removal ratio as investigated by cooling the exhaust gas in a water spray cooling device.

The average cooling ratio of the exhaust gas is a difference in exhaust gas temperature between at the inlet and the outlet of the water spray cooling device divided by the exhaust gas residence time (i.e., the device volume ($m^3$) divided by the exhaust gas flow rate ($m^3$/sec) in the water spray cooling device). For example, the average cooling ratio is calculated to be 10° C./sec when the exhaust gas flow rate is 50 $m^3$/sec, and a difference in exhaust gas temperature between at the inlet and the outlet of the water spray cooling device (device volume 1000 $m^3$) is 200° C.

The mercury removal ratio is calculated from the total amount of mercury contained in the exhaust gas and the amount of mercury transferred to the slurry in the water spray cooling device in accordance with formula (2) below.

Mercury removal ratio=100×Hg-dust/Hg-gas (2)

Hg-gas: the total amount (g/hr) of mercury contained in the exhaust gas

Hg-dust: the amount (g/hr) of mercury transferred to the slurry in the water spray cooling device The total amount of mercury in the exhaust gas may be calculated from the analysis results of the mercury content of the exhaust gas sampled in an area that is near the exhaust gas source and has a temperature range of several hundred degrees centigrade or higher above the boiling point of mercury, or may be obtained by analyzing and summing the amount of mercury transferred to the slurry in the water spray cooling device and the amount of mercury remaining in the exhaust gas sampled downstream of the water spray cooling device. In Examples described below, the total amount of mercury in the exhaust gas was calculated by the former method.

The amount (g/hr) of mercury in the exhaust gas is the exhaust gas flow rate ($m^3$/hr) multiplied by the mercury concentration (g/$m^3$) in the exhaust gas determined in accordance with wet absorption-cold vapor atomic absorption spectrometry in JIS K0222. The amount (g/hr) of mercury transferred to the slurry in the water spray cooling device is the amount (kg/hr) of generated solid multiplied by the mercury concentration (g/kg-solid) in the slurry determined in accordance with "Sediment monitoring method", Notification No. 120725002, Water Environment Division, Environment Management Bureau, Ministry of the Environment.

Considering that mercury in the exhaust gas is removed as a liquid mercury, the mercury removal ratio in FIG. 1 is preferably 100 mass %. The mercury removal ratio is low while the average cooling ratio is low. This is because the effect of cooling the gas is so small that water-soluble mercury chloride in the formula (1) is generated and mercury is transferred to (or dissolved in) cooling water (i.e., water constituting the slurry). In a region at low average cooling ratios, the mercury removal ratio tends to increase as the average cooling ratio (or water volume ratio) increases.

The mercury removal ratio substantially reaches 100 mass % at a cooling ratio of 4.5° C./sec, and the mercury removal ratio substantially stays at 100 mass % after reaching 100 mass %. This may be because the exhaust gas is sufficiently cooled at an average cooling ratio of 4.5° C./sec or higher and, as a result, a liquid mercury is generated instead of generation of mercury chloride. In fact, the inventors confirmed that most of mercury in the exhaust gas is transferred to the solid of the slurry, and almost no mercury is found in the liquid component of the slurry according to the analysis. To further increase the cooling ratio, it is necessary to increase the diameter of a water pipe or the power of a pump, reducing economical efficiency. Thus, the upper limit of the average cooling ratio is about 18.0° C./sec from a practical standpoint. In embodiments, the average cooling ratio of the exhaust gas is preferably from 4.5 to 18.0° C./sec.

The water spray cooling device for rapidly cooling the exhaust gas may have any structure, but typically includes one or more water spray nozzles for spaying cooling water in a shower form from above into the space in the device through which the exhaust gas passes. In the water spray cooling device, the dust in the exhaust gas is also normally trapped in cooling water and removed from the exhaust gas.

Examples of the type of exhaust gas containing mercury in metal vapor phase to be treated by the method according to the disclosed embodiments include, but are not limited to, exhaust gas emitted from incinerators, such as municipal waste and industrial waste incinerators, and general exhaust gas generated from high-temperature processes, such as those in various heat treatment furnaces and boilers (e.g., exhaust gas generated in heat treatment of minerals, boiler exhaust gas).

Figure 2:
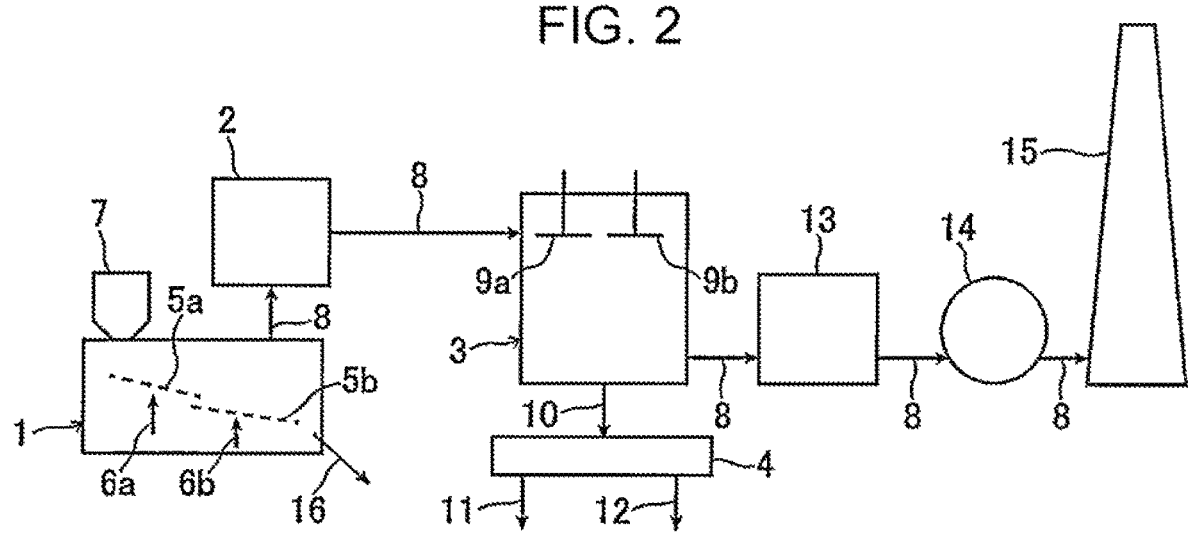
FIG. 2 is a schematic diagram of a method according to an embodiment.

FIG. 2 is a schematic diagram of a method according to an embodiment, where the disclosed embodiments are applied to the treatment of incinerator exhaust gas generated in a stoker-type municipal waste incinerator.

In the figure, the reference number 1 denotes a stoker-type municipal waste incinerator, the reference number 2 denotes a boiler that recovers heat from a high-temperature exhaust gas 8 (exhaust gas containing mercury in metal vapor phase) emitted from the municipal waste incinerator 1, the reference number 3 denotes an exhaust gas cooling device that rapidly cools the exhaust gas 8 from the boiler 2 to condense mercury in the exhaust gas into liquid mercury so as to separate mercury from the exhaust gas. The exhaust gas cooling device 3 is a water spray cooling device in this embodiment. The reference number 4 denotes a solid-liquid separation device that subjects the slurry (sprayed cooling water+mercury that has condensed to metal liquid+trapped dust) generated in the exhaust gas cooling device 3 (water spray cooling device) to solid-liquid separation.

The municipal waste incinerator 1 includes two stokers including a stoker 5a for drying and a stoker 5b for burning. Air 6a for drying is supplied to the stoker 5a from below, and air 6b for burning is supplied to the stoker 5b from below. Two or more stokers are normally provided, or three or more stokers may be provided to sufficiently dry and burn waste. Municipal waste (waste collected from the city) is loaded into the municipal waste incinerator 1 from a supply device 7, and the loaded municipal waste is dried on the stoker 5a and burned on the stoker 5b. Ash 16 after burning is removed from the municipal waste incinerator 1 as necessary and, for example, filled in landfills.

The exhaust gas cooling device 3 has water spray nozzles 9a and 9b in an upper space in the device through which the exhaust gas passes. The exhaust gas cooling device 3 may have any number of water spray nozzles 9 and has one water spray nozzle 9 or two or more water spray nozzles 9. The high-temperature exhaust gas 8 (exhaust gas containing mercury in metal vapor phase) generated in the municipal waste incinerator 1 is transferred to the boiler 2 to recover its heat, then introduced into the exhaust gas cooling device 3 while containing mercury in metal vapor phase, and rapidly cooled with water sprayed from the water spray nozzles 9a and 9b (average cooling ratio: 4.5 to 18.0° C./sec). The rapid cooling causes mercury in the exhaust gas 8 to condense from metal vapor phase into metal liquid so as to separate from the exhaust gas 8 and causes the dust (solid particles) contained in the exhaust gas 8 to be trapped in cooling water so as to separate from the exhaust gas.

The metal mercury particles that have condensed to metal liquid and separated from the exhaust gas 8 are dispersed in cooling water accumulating in the device so as to, for example, adhere to the dust separated from the exhaust gas similarly, forming a slurry-like material (slurry 10). The slurry 10 is discharged from the exhaust gas cooling device 3 and separated into separated water 11 and a solid 12 (containing liquid mercury) in the solid-liquid separation device 4.

When the exhaust gas is rapidly cooled by appropriately controlling the cooling conditions in the exhaust gas cooling device 3 in accordance with the disclosed embodiments, almost no mercury is transferred to (i.e., almost no mercury chloride is dissolved in) the separated water 11, and almost entire mercury can be transferred to the solid 12 with mercury in a metal liquid form.

The separated water 11 collected from the solid-liquid separation device 4 can be circulated and reused in the water spray nozzles 9a and 9b. The recovery of mercury is achieved by properly treating the solid 12 containing liquid mercury without affecting the environment.

The exhaust gas 8 cleaned in the exhaust gas cooling device 3 and free of mercury passes through a cleaning device 13 and a blower 14 for sucking exhaust gas and is released into the atmosphere from a chimney 15.

In the embodiment described above, the disclosed embodiments are applied to the treatment of incinerator exhaust gas generated in a stoker-type municipal waste incinerator. As described above, the disclosed embodiments can be applied to the treatment of exhaust gas generated from various high-temperature processes (e.g., high-temperature processes in various heat treatment furnaces, boilers, and other heating systems).

The exhaust gas is rapidly cooled by spraying water in the foregoing description, but the exhaust gas may be rapidly cooled by a method other than spraying water in the disclosed embodiments. Examples of the exhaust gas rapid cooling method other than spraying water include, but are not limited to, the following methods.

(i) Immersing an end of an exhaust gas pipe in a water tank and generating bubbles (ii) Increasing the specific surface area of an exhaust gas pipe by branching the exhaust gas pipe into multiple smaller pipes, and bringing the exhaust gas into contact with a coolant, such as air or water (iii) Installing a cooling device using air or water as a coolant in an exhaust gas pipe The method (i) may require an increase in gas pressure because the exhaust gas pressure needs to be increased by the water pressure. The method (ii) requires, for example, a cyclone or filter for dust collection, increasing the facility costs but generating an advantage of heat exchange. The method (ii) is thus effective when the coolant needs to be heated. The method (iii) requires installing a scraping device or a dust discharging mechanism as necessary because mercury and other adhesive substances adhere to the pipe wall and the cooling device surface.

EXAMPLES

The exhaust gas was treated by the method according to the disclosed embodiments using the facility shown in FIG. 2 (Examples 1 to 5). In Examples, the average cooling ratio of the exhaust gas and the mercury removal ratio were calculated by the same methods as in the test in FIG. 1 described above.

Example 1

In a municipal waste incineration facility with a municipal waste treatment capacity of 19.9 t/d and an exhaust gas volume of 3800 m$^3$/hr, an exhaust gas was rapidly cooled in a water spray cooling device (i.e., exhaust gas cooling device) with a volume of 55 m$^3$. The exhaust gas temperature at the inlet of the water spray cooling device, which depends on the calory of the municipal waste, was 453° C. in Example 1, and the average cooling ratio of the exhaust gas in the water spray cooling device was calculated to be 7.5° C./sec. From the analysis result of the mercury content, the mercury removal ratio was calculated to be 98.5%. In Example 1, a high mercury removal ratio was achieved without a need of additional facility reinforcement (e.g., additional piping) work.

Example 2

In a municipal waste incineration facility with a municipal waste treatment capacity of 35.9 t/d and an exhaust gas volume of 6850 m$^3$/hr, an exhaust gas was rapidly cooled in a water spray cooling device (exhaust gas cooling device) with a volume of 55 m$^3$. The exhaust gas temperature at the inlet of the water spray cooling device, which depends on the calory of the municipal waste, was 388° C. in Example 2, and the average cooling ratio of the exhaust gas in the water spray cooling device was calculated to be 11.3° C./sec. From the analysis result of the mercury content, the mercury removal ratio was calculated to be 99.0%. In Example 2, a high mercury removal ratio was achieved without a need of additional facility reinforcement (e.g., additional piping) work.

Example 3

In a municipal waste incineration facility with a municipal waste treatment capacity of 43.2 t/d and an exhaust gas volume of 8250 m$^3$/hr, an exhaust gas was rapidly cooled in a water spray cooling device (exhaust gas cooling device) with a volume of 55 m$^3$. The exhaust gas temperature at the inlet of the water spray cooling device, which depends on the calory of the municipal waste, was 430° C. in Example 3, and the average cooling ratio of the exhaust gas in the water spray cooling device was calculated to be 15.3° C./sec. From the analysis result of the mercury content, the mercury removal ratio was calculated to be 99.1%. In Example 3, a high mercury removal ratio was achieved without a need of additional facility reinforcement (e.g., additional piping) work.

Example 4

In a municipal waste incineration facility with a municipal waste treatment capacity of 13.6 t/d and an exhaust gas volume of 2600 m$^3$/hr, an exhaust gas was rapidly cooled in a water spray cooling device (exhaust gas cooling device) with a volume of 55 m$^3$. The exhaust gas temperature at the inlet of the water spray cooling device, which depends on the calory of the municipal waste, was 389° C. in Example 4, and the average cooling ratio of the exhaust gas in the water spray cooling device was calculated to be 4.3° C./sec. From the analysis result of the mercury content, the mercury removal ratio was calculated to be 90.8%. In Example 4, a high mercury removal ratio was achieved without a need of additional facility reinforcement (e.g., additional piping) work.

Example 5

In a municipal waste incineration facility with a municipal waste treatment capacity of 48.7 t/d and an exhaust gas volume of 9300 m$^3$/hr, an exhaust gas was rapidly cooled in a water spray cooling device (exhaust gas cooling device) with a volume of 55 m$^3$. The exhaust gas temperature at the inlet of the water spray cooling device, which depends on the calory of the municipal waste, was 455° C. in Example 5, and the average cooling ratio of the exhaust gas in the water spray cooling device was calculated to be 18.5° C./sec. From the analysis result of the mercury content, the mercury removal ratio was calculated to be 99.2%. In Example 5, it was necessary to increase the amount of sprayed water in order to achieve an average cooling ratio higher than 18.0° C./sec, and there was a need of additional facility reinforcement (i.e., additional piping) work because of inadequate supply of cooling water from the current pipe. The facility reinforcement increased the mercury removal ratio but resulted in high costs for the exhaust gas treatment.

Comparative Example 1

In a municipal waste incineration facility with a municipal waste treatment capacity of 46.8 t/d and an exhaust gas volume of 8930 m$^3$/hr, the operation ran without using a water spray cooling device (exhaust gas cooling device) (i.e., without cooling the exhaust gas by spraying water). In this case, a cyclone-type dust remover was installed to remove, from the exhaust gas, the dust entrained in the exhaust gas. The dust was efficiently removed with the cyclone-type dust remover, and the dust concentration from the smokestack reached an allowable level. However, it was necessary to install an activated carbon adsorber for removing mercury. In Comparative Example 1, the facility costs and the operation costs were much higher than those in Examples because of increased facility costs associated with the installation of the dust remover and the activated carbon adsorber as well as costs for a factory for regenerating activated carbon having lost its adsorptive capacity or costs for purchasing new activated carbon replacing spent activated carbon.

The results of Examples and Comparative Example described above are shown together with the treatment conditions in Table 1.

TABLE 1

|  |  | Example 1 | Example 2 | Example 3 | Example 4 | Example 5 | Comparative Example 1 |
|---|---|---|---|---|---|---|---|
| Municipal waste treatment capacity | (t/d) | 19.9 | 35.9 | 43.2 | 13.6 | 48.7 | 46.8 |
| Incinerator exhaust gas volume | ($m^3$/hr) | 3800 | 6850 | 8250 | 2600 | 9300 | 8930 |
| Water spray cooling device volume | ($m^3$) | 55 | 55 | 55 | 55 | 55 | — |
| Exhaust gas residence time in water spray cooling device | (sec) | 52.1 | 28.9 | 24.0 | 76.2 | 21.3 | — |
| Exhaust gas temperature at inlet of water spray cooling device | (° C.) | 453 | 388 | 430 | 389 | 455 | — |
| Exhaust gas temperature at outlet of water spray cooling device | (° C.) | 61 | 60 | 62 | 60 | 62 | — |
| Exhaust gas average cooling ratio in water spray cooling device | (° C./sec) | 7.5 | 11.3 | 15.3 | 4.3 | 18.5 | — |
| Mercury concentration in exhaust gas before water spray cooling | ($\mu$g/$Nm^3$) | 0.80 | 0.75 | 0.82 | 0.78 | 0.76 | — |
| Amount of mercury in exhaust gas before water spray cooling | (mg/hr) | 3 | 5 | 7 | 2 | 7 | — |
| Mercury concentration in slurry solid | (mg/kg) *1 | 88.5 | 83.4 | 91.3 | 79.6 | 84.7 | — |
| Amount of generated slurry solid | (g/hr) *1 | 33.8 | 61.0 | 73.4 | 23.1 | 82.8 | — |
| Mercury removal ratio | (mass %) | 98.5 | 99.0 | 99.1 | 90.8 | 99.2 | — |
| Additional piping work |  | without work | without work | without work | without work | with work | — |
| Work for installing dry-type dust remover |  | not required | not required | not required | not required | not required | required |
| Adsorption of mercury on activated carbon |  | not required | not required | not required | not required | not required | required |

*1 slurry: slurry generated in water spray cooling

The invention claimed is:

1. An exhaust gas treatment method comprising; cooling an exhaust gas containing mercury in metal vapor phase at an average cooling ratio in a range of 4.5 to 18.0° C./sec by spraying water into the exhaust gas, thereby condensing the mercury in the exhaust gas from the metal vapor phase into metal liquid in order to separate and remove the mercury from the exhaust gas; collecting water sprayed into the exhaust gas; separating the collected water into separated water and a solid containing the mercury that has condensed to the metal liquid; and recovering the mercury from the solid.

2. An exhaust gas treatment facility comprising: a water spray cooling device configured to spray water into an exhaust gas containing mercury in metal vapor phase to cool the exhaust gas at an average cooling ratio in a range of 4.5 to 18.0° C./sec, thereby condensing the mercury in the exhaust gas from the metal vapor phase into metal liquid in order to separate and remove the mercury from the exhaust gas; and a solid-liquid separation device configured to collect water sprayed into the exhaust gas; separate the collected water into separated water and a solid containing the mercury that has condensed to the metal liquid; and recover the mercury from the solid.

3. The exhaust gas treatment method according to claim 1, wherein the average cooling ratio is in a range of 7.5 to 18.0° C./sec.

4. The exhaust gas treatment facility according to claim 2, wherein the average cooling ratio is in a range of 7.5 to 18.0° C./sec.

* * * * *